US008942173B2

(12) United States Patent
Li et al.

(10) Patent No.: US 8,942,173 B2
(45) Date of Patent: Jan. 27, 2015

(54) INTERFERENCE NOTIFICATION IN DEVICE-TO-DEVICE COMMUNICATION

(71) Applicant: Intel Corporation, Santa Clara, CA (US)

(72) Inventors: Honggang Li, Beijing (CN); Qinghua Li, San Ramon, CA (US); Rui Huang, Beijing (CN); Jong-Kae Fwu, Sunnyvale, CA (US); Yuan Zhu, Beijing (CN); Xiaogang Chen, Beijing (CN); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 13/665,715

(22) Filed: Oct. 31, 2012

(65) Prior Publication Data

US 2013/0272196 A1 Oct. 17, 2013

Related U.S. Application Data

(60) Provisional application No. 61/624,185, filed on Apr. 13, 2012, provisional application No. 61/646,223, filed on May 11, 2012.

(51) Int. Cl.
*H04Q 7/00* (2006.01)
*H04Q 7/24* (2006.01)

(52) U.S. Cl.
USPC .......................................... 370/328; 370/338

(58) Field of Classification Search
None
See application file for complete search history.

(56) References Cited

U.S. PATENT DOCUMENTS

| | | | | |
|---|---|---|---|---|
| 7,852,767 | B2 * | 12/2010 | Twiss | 370/235 |
| 7,920,887 | B2 * | 4/2011 | Cho et al. | 455/518 |
| 8,155,686 | B2 * | 4/2012 | Lee et al. | 455/522 |
| 2008/0037485 | A1 | 2/2008 | Osinga et al. | |
| 2012/0044815 | A1 * | 2/2012 | Geirhofer et al. | 370/248 |
| 2012/0106517 | A1 * | 5/2012 | Charbit et al. | 370/336 |
| 2014/0120907 | A1 * | 5/2014 | Yu et al. | 455/426.1 |

FOREIGN PATENT DOCUMENTS

| | | | |
|---|---|---|---|
| KR | 1020080005058 | A | 1/2008 |
| KR | 1020110103852 | A | 9/2011 |
| KR | 1020120028197 | A | 3/2012 |

OTHER PUBLICATIONS

International Search Report and Written Opinion for International Application No. PCT/US2013/035999, mailed Jul. 29, 2013.

International Preliminary Report on Patentability mailed Oct. 23, 2014 from International Application No. PCT/US2013/035999.

* cited by examiner

*Primary Examiner* — Hong Cho

(74) *Attorney, Agent, or Firm* — Schwabe, Williamson & Wyatt, P.C.

(57) ABSTRACT

Systems and techniques for wireless device-to-device (D2D) communication are provided herein. A D2D group identifier may be included in wireless transmissions within D2D groups. D2D interference mitigation processes may be initiated when a D2D group identifier is detected by a wireless device outside the D2D group.

27 Claims, 11 Drawing Sheets

202
200
214
D2D Communication Module
204
Receiver/ Transmitter Module
210
Base Station Communication Module
206
Group Identifier Detection Module
208
Interference Measurement Module
212
Control Header Generation Module

INTERFERENCE NOTIFICATION IN DEVICE-TO-DEVICE COMMUNICATION

CROSS REFERENCE TO RELATED APPLICATIONS

The present application claims priority to U.S. Provisional Patent Application No. 61/624,185, filed Apr. 13, 2012, entitled "Advanced Wireless Communication Systems and Techniques," and to U.S. Provisional Patent Application No. 61/646,223, filed May 11, 2012, entitled "Advanced Wireless Communication Systems and Techniques," the entire disclosures of which are hereby incorporated by reference in their entireties.

TECHNICAL FIELD

The present disclosure relates generally to wireless communication networks, and more particularly, to interference notification in device-to-device communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless devices may communicate with each other in a wireless communication environment. Some wireless devices may be configured to communicate directly with other wireless devices, e.g., via device-to-device ("D2D") communication. Multiple D2D communication devices may operate as a group and form a communication network.

When two or more D2D communication groups are within proximity, intra-group communication in one D2D communication group may be compromised by interference from intra-group communication in another D2D communication group. Existing D2D communication devices may not be capable of identifying the source of the interference nor initiating any process to mitigate the interference.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
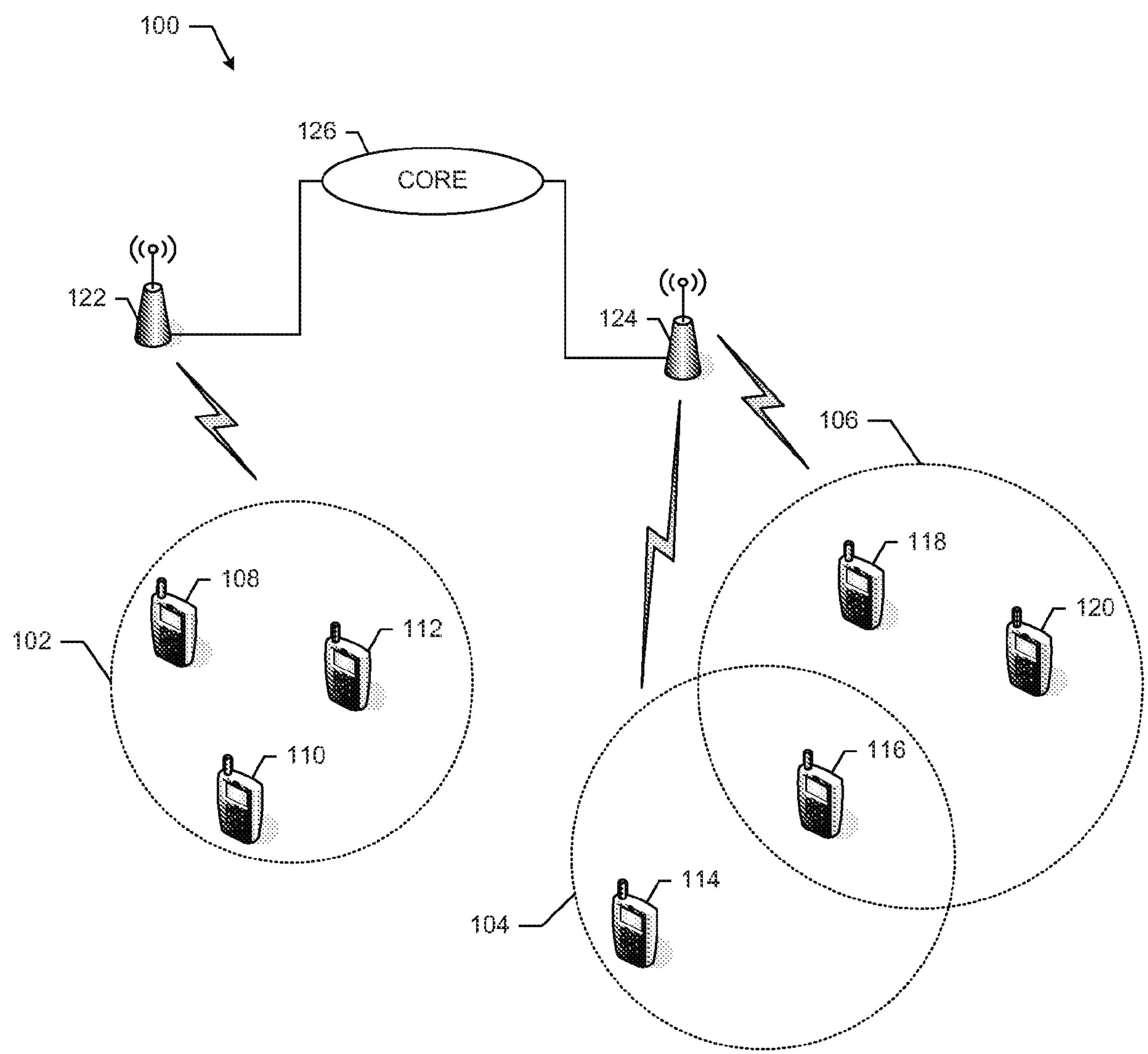
FIG. 1 is a schematic diagram of an example wireless communication environment, in accordance with various embodiments.

Embodiments of systems and techniques for interference notification in D2D communication are described. In some embodiments, a first wireless device may belong to a first D2D communication group and may be served by a first base station. The first wireless device may detect a group identifier in a wireless transmission from a second wireless device served by a second base station. The group identifier may be representative of a second D2D communication group to which the second wireless device belongs, and the second D2D communication group may be different from the first D2D communication group. The first wireless device may transmit the group identifier or an identifier of the second base station to the first base station to notify the first base station of interference from the second D2D communication group.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

The embodiments described herein may be used in a variety of applications including transmitters and receivers of a mobile wireless radio system. Radio systems specifically included within the scope of the embodiments include, but are not limited to, network interface cards ("NICs"), network adaptors, base stations, access points ("APs"), relay nodes, Node Bs, gateways, bridges, hubs and satellite radiotelephones. Further, the radio systems within the scope of embodiments may include satellite systems, personal communication systems ("PCS"), two-way radio systems, global positioning systems ("GPS"), two-way pagers, personal computers ("PCs") and related peripherals, personal digital assistants ("PDAs"), and personal computing, among others.

Referring now to FIG. 1, an example wireless communication environment 100, in accordance with various embodiments, is illustrated. Wireless communication environment 100 may be configured as one or more wireless communication networks, such as a wireless personal area network ("WPAN"), a wireless local area network ("WLAN"), and a wireless metropolitan area network ("WMAN"). Wireless communication environment 100 may include one or more wireless devices, generally shown as 108, 110, 112, 114, 116, 118 and 120. In some embodiments, wireless devices 108, 110, 112, 114, 116, 118 and 120 may be configured to communicate with other wireless devices and may be referred to as device-to-device ("D2D") communication devices. A D2D communication device may include a mobile station, as defined by Institute for Electrical and Electronic Engineers ("IEEE") 802.16e (2005), 802.16m (2009), or subsequent revisions, releases, or updates thereto, or user equipment, as defined by the $3^{rd}$ Generation Partnership Project ("3GPP") Long Term Evolution ("LTE") Release 8 (2008), Release 9 (2009), Release 10 (2011), or subsequent revisions, releases, or updates thereto. As will be described in more detail below, one or more of wireless devices 108, 110, 112, 114, 116, 118 and 120 may be configured with the teachings of the present disclosure to provide D2D interference notification.

Wireless devices 108, 110, 112, 114, 116, 118 and 120, which may also be referred to as user equipment (UE), may be configured to communicate via radio links with one or more base stations, generally shown as 122 and 124. Many of the examples described herein may refer to wireless communication networks that conform with 3GPP for ease of discussion; however, the subject matter of the present disclosure is not limited in this regard and the described embodiments may apply to other wireless communication networks that may benefit from the systems and techniques described herein. Wireless devices 108, 110, 112, 114, 116, 118 and 120 may also operate in one or more D2D communication groups. As illustrated in FIG. 1, wireless devices 108, 110 and 112 may be included in D2D communication group 102, wireless devices 114 and 116 may be included in D2D communication group 104, and wireless devices 116, 118 and 120 may be included in D2D communication group 106. Each D2D communication group (e.g., D2D communication groups 102, 104 and 106) may form a wireless communication network between the wireless devices in the group. Intra-group communications may take place over one or more wireless communication channels (defined, for example, by one or more frequency bands). In some embodiments, the channel(s) associated with a D2D group may be allocated to that group by a base station serving that group. For example, as illustrated in FIG. 1, base station 122 may serve D2D communication group 102, and base station 124 may serve D2D communication groups 104 and 106. Base stations 122 and 124 may be connected to core network 126, through which authentication and inter-base station communication may Occur.

In some embodiments, base stations 122 and 124 may include or be included in one or more Node Bs (also commonly denoted as "evolved Node Bs," "enhanced Node Bs," "eNode Bs," or "eNBs" in 3GPP LTE). Wireless devices 108, 110, 112, 114, 116, 118 and 120 may be configured to communicate using a multiple-input and multiple-output ("MIMO") communication scheme. Base stations 122 and 124 may include one or more antennas, one or more radio modules to modulate and/or demodulate signals transmitted or received on an air interface, and one or more digital modules to process signals transmitted and received on the air interface. One or more antennas of wireless devices 108, 110, 112, 114, 116, 118 and 120 may be used to concurrently utilize radio resources of multiple respective component carriers (e.g., which may correspond with antennas of base stations 122 and 124) of the wireless communication environment 100. Wireless devices 108, 110, 112, 114, 116, 118 and 120 may be configured to communicate using Orthogonal Frequency Division Multiple Access ("OFDMA") in, e.g., downlink communications, and/or Single-Carrier Frequency Division Multiple Access ("SC-FDMA") in, e.g., uplink communications, in some embodiments.

Wireless devices 108, 110, 112, 114, 116, 118 and 120 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts seven user devices, wireless communication environment 100 may include more or fewer user devices.

Wireless devices 108, 110, 112, 114, 116, 118 and 120 may use a variety of modulation techniques such as spread spectrum modulation (e.g., direct sequence code division multiple access ("DS-CDMA") and/or frequency hopping code division multiple access ("FH-CDMA")), time-division multiplexing ("TDM") modulation, frequency-division multiplexing ("FDM") modulation, orthogonal frequency-division multiplexing ("OFDM") modulation, multi-carrier modulation ("MDM"), and/or other suitable modulation techniques to communicate via wireless links. Embodiments of the systems and techniques described herein may be implemented in broadband wireless access networks including networks operating in conformance with one or more protocols specified by 3GPP and its derivatives, the WiMAX Forum, the IEEE 802.16 standards (e.g., IEEE 802.16-2005 Amendment), the LTE project along with any amendments, updates, and/or revisions (e.g., advanced LTE project, ultra mobile broadband ("UMB") project (also referred to as "3GPP2"), etc.). Although some of the above examples are described above with respect to standards developed by 3GPP, the present disclosure is readily applicable to many specifications and/or standards developed by other special interest groups and/or standard development organizations (e.g., Wireless Fidelity ("Wi-Fi") Alliance, Worldwide Interoperability for Microwave Access ("WiMAX") Forum, Infrared Data Association (IrDA), etc.).

Figure 2:
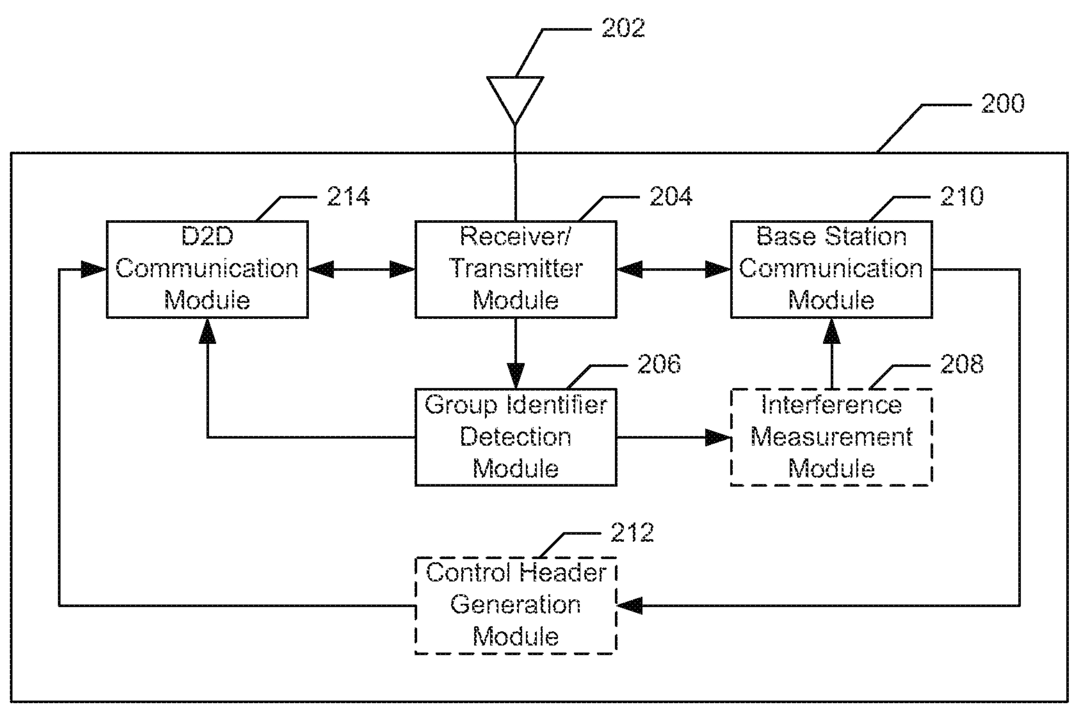
FIG. 2 is a block diagram of an example D2D wireless communication device configured for D2D interference notification in accordance with various embodiments.

Referring now to FIG. 2, an example D2D wireless communication device 200 configured for D2D interference notification is illustrated, in accordance with various embodiments. The components of wireless device 200, discussed in detail below, may be included in any one or more of the wireless devices discussed above with reference to FIG. 1, including any of wireless devices 108, 110, 112, 114, 116, 118 and 120, or any other suitable wireless device. In some embodiments, wireless device 200 is a mobile wireless device, such as a PDA, cellular telephone, tablet computer or laptop computer. In the embodiments of FIG. 2 discussed below, wireless device 200 is considered to belong to a first D2D communication group that includes one or more other wireless devices (e.g., as discussed above with reference to D2D communication groups 102, 104 and 106 of FIG. 1).

Wireless device 200 may include antenna 202. Antenna 202 may include one or more directional or omni-directional antennas such as dipole antennas, monopole antennas, patch antennas, loop antennas, microstrip antennas, and/or other types of antennas suitable for reception of radio frequency (RF) or other wireless communication signals. Although FIG. 2 depicts a single antenna, wireless device 200 may include additional antennas.

Wireless device 200 may include receiver/transmitter module 204. Antenna 202 may be coupled to receiver/transmitter module 204. Receiver/transmitter module 204 may be configured for receiving and transmitting wireless signals to and from other wireless devices and/or base stations, such as any of the wireless devices and/or base stations discussed above with reference to FIG. 1. In some embodiments, receiver/transmitter module 204 may receive a wireless transmission from another wireless device in the first D2D communication group, from a wireless device in a second D2D communication group different from the first D2D communication group, from a base station serving wireless device 200 or the first D2D communication group (or both), or one or more of such wireless transmissions.

Wireless device 200 may include D2D communication module 214. In some embodiments, a wireless transmission received at or transmitted by receiver/transmitter module 204 may be received or transmitted on a channel allocated to the first D2D communication group, and may be processed by D2D communication module 214. The allocated channel may comprise, for an example, an allocated set of frequencies. In some embodiments, wireless device 200 may communicate with other members of the first D2D communication group according to a multiple access protocol (such as carrier sense multiple access, "CSMA") implemented at least in part by D2D communication module 214 and receiver/transmitter module 204.

Wireless device 200 may include group identifier detection module 206. Group identifier detection module 206 may be coupled to receiver/transmitter module 204. In some embodiments, group identifier detection module 206 may be configured to detect a group identifier in a wireless transmission received at receiver/transmitter module 204. As used herein, a "group identifier" may refer to information that uniquely or non-uniquely identifies an associated D2D communication group. For example, a group identifier may include an identification name or number associated with a D2D communication group. In some embodiments, a group identifier includes information about one or more characteristics of the associated D2D communication group, such as information about a base station serving the D2D communication group, the number of devices included in the D2D communication group, or a location or geographic reference point associated with the D2D communication group, for example. Group identifier detection module 206 may further be configured to identify a base station serving the D2D communication group based on the group identifier (e.g., using a lookup table or a mapping module, as discussed in additional detail below with reference to base station identification module 408 of base station 400 of FIG. 4). In some embodiments, group identifier detection module 206 may be configured to identify a group identifier in a group identifier field of a control header of a wireless transmission received at receiver/transmitter module 204. Illustrative embodiments of control header formats in which a group identifier field may be included are discussed below with reference to Tables 1 and 2, below.

Wireless device 200 may also include interference measurement module 208. Interference measurement module 208 may be coupled to group identifier module 206 and, in some embodiments, when group identifier module 206 identifies a wireless transmission originating from a second wireless device belonging to a second D2D communication group different from the first D2D communication group, may be configured to measure a level of interference from the second wireless device. For example, interference measurement module 208 may measure the power in a wireless transmission received at wireless device 200 from another wireless device belonging to a different D2D communication group. In some embodiments, interference measurement module 208 may not perform a measurement unless a group identifier corresponding to a D2D communication group other than the first D2D communication group (to which wireless device 200 belongs) is identified by group identifier detection module 206. In some embodiments, interference measurement module 208 may not be included in wireless device 200. In some such embodiments, the detection of an identifier of another D2D communication group by group identifier detection module 206 may be sufficient to signal the presence of interference, and thus no additional interference measurement may be performed.

Wireless device 200 may also include base station communication module 210. Base station communication module 210 may be coupled to receiver transmitter module 204 and to interference measurement module 208. In embodiments in which interference measurement module 208 is not included in wireless device 200, base station communication module 210 may be coupled to group identifier detection module 206. In some embodiments, information about a group identifier identified by group identifier detection module 206 may be passed to base station communication module 210 for transmission to a base station serving wireless device 200. In some embodiments, information about a base station serving the D2D communication group corresponding to the group identifier identified by group identifier detection module 206 may be passed to base station communication module 210 for transmission to a base station serving wireless device 200. In some embodiments, base station communication module 210 may receive, from the base station serving wireless device 200, an identifier for the first D2D communication group. The identifier for the first D2D communication group may be included in wireless transmissions sent between devices in the first D2D communication group via D2D communication module 214. In some embodiments, base station communication module 210 may receive, from the base station serving wireless device 200, a signal indicative of a control header format to be used when assembling packets for intra-group D2D communications, as discussed in additional detail below.

Wireless device 200 may also include control header generation module 212. Control header generation module 212 may be coupled to base station communication module 210. In some embodiments, control header generation module 212 may receive an identifier of the first D2D communication group from base station communication module 210 and may include the identifier in a control header of wireless communications transmitted by wireless device 200 to other wireless devices in the first D2D communication group.

Any of a number of control header formats may be used. In some embodiments, control headers may support carrier sensing and virtual sensing by providing notification of reservation times for the control header and following related transmissions so that other D2D devices that detect the control header may avoid collisions. In some embodiments, control headers may support random-based channel access by providing identification of the session valid in a local area (e.g., a cell sector or smaller area). In some embodiments, control headers may have variable sizes and may be delivered via variable packet formats. In some such embodiments, a control header may provide notification of control type and data descriptive of the number of bytes allocated for control and data information. In some embodiments, the size of a control header may be selected to be as small as possible while still conveying necessary information for D2D communication in order to minimize overhead and reserve more space for data payloads. In some embodiments, control headers may be unencrypted in order to be read by all D2D devices (e.g., for carrier sensing and virtual sensing). A base station (e.g., an eNB) or some higher network component may indicate the configuration of D2D control header pseudo-statically or dynamically (e.g., the format of control header and how many bits for each field), so that more-efficient control headers may be used.

In some embodiments, for wireless transmissions sent from wireless device 200 to other devices belonging to the first D2D communication group, control header generation module 212 may include an identifier of the first D2D communication group in a control header according to the "long" control header format of Table 1, below.

TABLE 1

An example "long" D2D control header format.

| Field | Size (bits) | Value/Description |
|---|---|---|
| Sender identifier | 6, 12 or other number | A unique or non-unique identifier of the sending device |
| Receiver identifier | 6, 12 or other number | A unique or non-unique identifier of the receiving device |
| Group identifier | 2 or more | A unique or non-unique identifier of the D2D communication group |
| Control type | 3 or other number | Indicates the type of control message (e.g., MCS indication, ACK, request to transmit, clear to transmit, etc.) |
| Size of control message | 4 or other number | Depends on number of control message sizes supported |
| Size of data payload | 3 or other number | Depends on number of data payload sizes supported |
| Control message | Variable | — |
| Duration | 2 or more | Indicates number of time slots occupied by the control header and a following related transmission (e.g., ACK) |

In some embodiments, control header generation module 212 may include a group identifier in a control header according to a "short" format. A "short" format may be appropriate when D2D communications from wireless device 200 are constrained in some way, and thus the full flexibility of a "long" control header format is not needed. For example, control header generation module 212 may use a "short" format when wireless device 200 communicates with at most one other device in the first D2D group, when control messages are of a fixed size, when data payloads are of a fixed size, or under other constrained conditions. In some embodiments, for wireless transmissions sent from wireless device 200 to other devices belonging to the first D2D communication group, control header generation module 212 may include an identifier of the first D2D communication group in a control header according to the "short" control header format of Table 2, below. In some embodiments, wireless device 200 does not include control header generation module 212.

TABLE 2

An example "short" D2D control header format.

| Field | Size (bits) | Value/Description |
|---|---|---|
| Receiver identifier | 6, 12 or other number | A unique or non-unique identifier of the receiving device |
| Group identifier | 2 or more | A unique or non-unique identifier of the D2D communication group |
| Control type | 3 or other number | Indicates the type of control message (e.g., MCS indication, ACK, request to transmit, clear to transmit, etc.) |
| Control message | Fixed number of bits | — |
| Duration | 1 or more | Indicates number of time slots occupied by the control header and a following related transmission (e.g., ACK) |

Figure 3A:
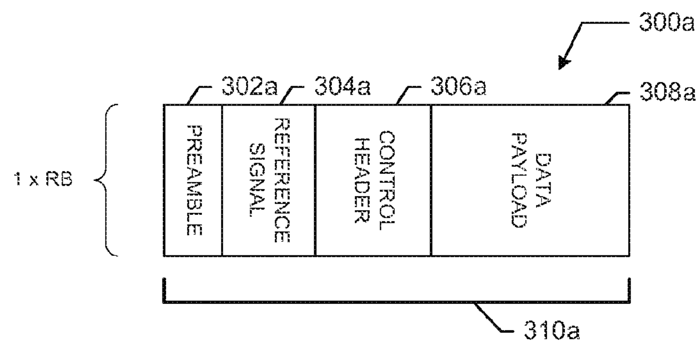
FIGS. 3A-3C illustrate different D2D communication packet formats, in accordance with various embodiments.
Figure 3B:
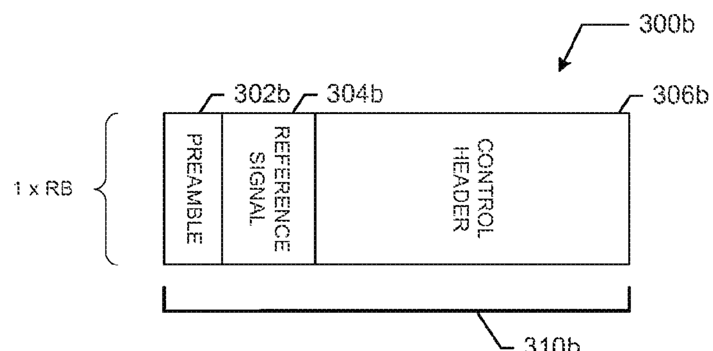
Figure 3C:
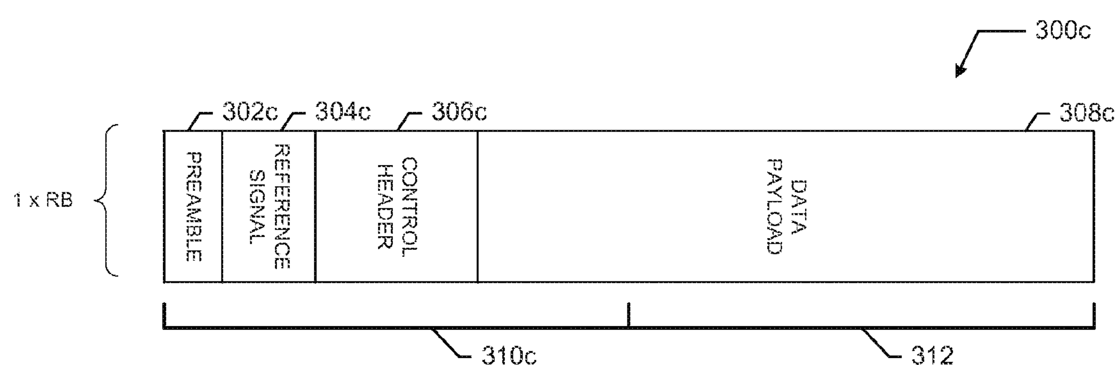

FIGS. 3A-3C illustrate different D2D communication packet formats, which may allocate control headers and data payloads across resource blocks ("RBs") and time slots, in accordance with various embodiments. The packets of FIGS. 3A-3C may be used, for example, when carrier sense multiple access with collision avoidance ("CSMA/CA") based multi-access is used for D2D communication, among other applications. In particular, the packets of FIGS. 3A-3C may be used with 3GPP LTE communication systems. In FIG. 3A, packet 300*a* may include, in single time slot 310*a*, short preamble 302*a*, reference signal 304*a*, control header 306*a* and data payload 308*a*. In some embodiments, packet 300*a* may be a default packet format for D2D communications. In FIG. 3B, packet 300*b* may include, in single time slot 310*b*, short preamble 302*b*, reference signal 304*b*, and control header 306*b*. In the configuration of FIG. 3B, the data payload may be transmitted in time slots separate from the time slot of control header 306*b*. In some applications, packet 300*b* may allow a larger control header than packet 300*a*. In FIG. 3C, packet 300*c* includes, across two time slots, short preamble 302*c*, reference signal 304*c*, control header 306*c* and data payload 308*c*. In particular, portions of data payload 308*c* may be included in both time slots 310*c* and 312. In some applications, packet 300*c* may allow a larger control header than packet 300*a* and may also allow the time remaining in first time slot 310*c* to be used for data payload.

Figure 4:
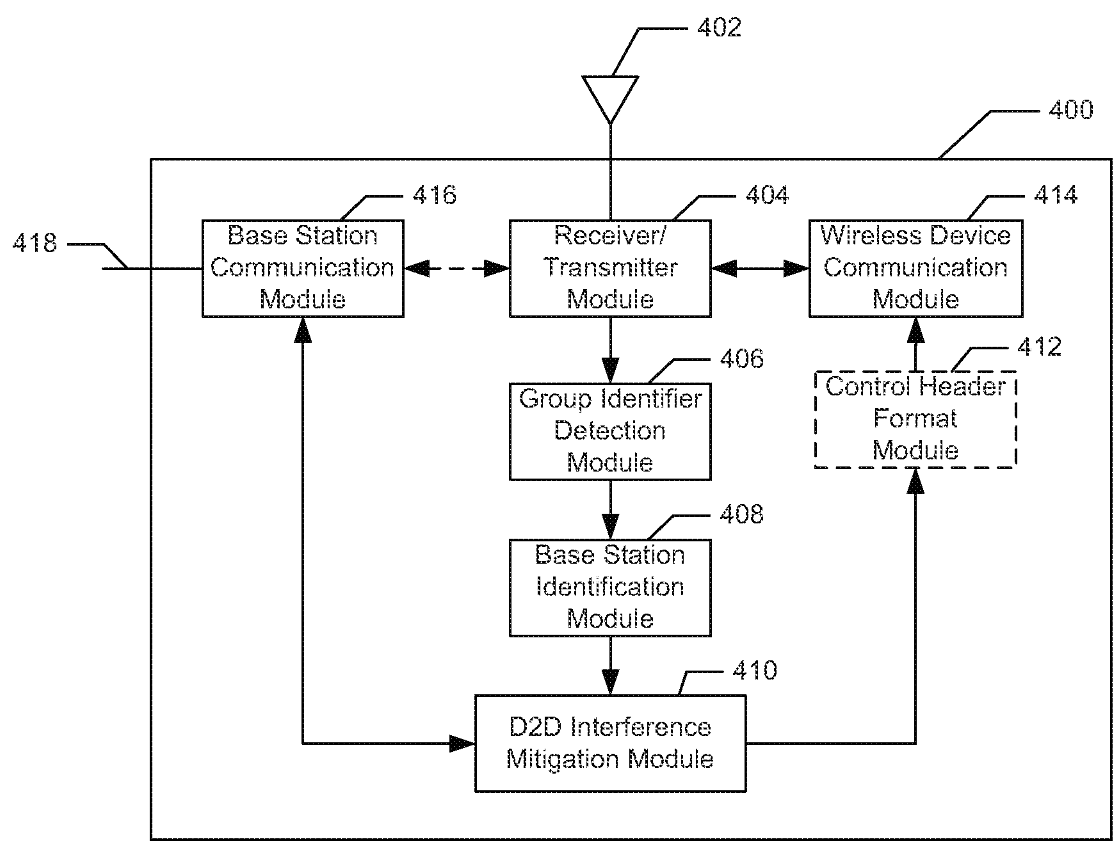
FIG. 4 is a block diagram of an example base station configured for D2D interference notification, in accordance with various embodiments.

Referring now to FIG. 4, an example base station 400 configured for D2D interference notification is illustrated, in accordance with various embodiments. The components of base station 400, discussed in detail below, may be included in any one or more of the base stations discussed above with reference to FIG. 1, including any of base stations 122 and 124. In some embodiments, base station 400 includes or is included in an eNB. In some embodiments, the components of base station 400 discussed below are included in a radio resource management ("RRM") server. Thus, any of the processes discussed herein as being performed by a base station may be performed by an RRM server as appropriate. In the embodiments of FIG. 4 discussed below, base station 400 is considered to serve one or more wireless devices in a first D2D communication group (e.g., as discussed above with reference to D2D communication groups 102, 104 and 106 of FIG. 1).

Base station 400 may include antenna 402. Antenna 402 may take any of the forms discussed above with reference to antenna 202 (FIG. 2). Although FIG. 4 depicts a single antenna, base station 400 may include additional antennas. Base station 400 may include receiver/transmitter module 404. Antenna 402 may be coupled to receiver/transmitter module 404. Receiver/transmitter module 404 may be configured for receiving and transmitting wireless signals to and from wireless devices, such as any of the wireless devices discussed above with reference to FIGS. 1 and 2.

Base station 400 may include group identifier detection module 406. Group identifier detection module 406 may be coupled to receiver/transmitter module 404. In some embodiments, group identifier detection module 406 may be configured to detect a group identifier in a wireless transmission received at receiver/transmitter module 404. The wireless transmission may be part of a D2D interference notification from a first wireless device served by base station 400, notifying base station 400 that communications of a second D2D group corresponding to the identifier are interfering with communications of a first D2D group to which the first wireless device belongs. In some embodiments, receiver/transmitter module 404 may detect, in a wireless transmission from the first wireless device belonging to the first D2D communication group, an identifier of the second D2D communication group or an identifier of a second base station serving a second wireless device belonging to the second D2D communication group. The group identifier or base station identifier may be transmitted to base station 400 from a base station communication module of the first wireless device (such as base station communication module 210 of FIG. 2, discussed above).

Base station 400 may include base station identification module 408. Base station identification module 408 may use the group identifier or base station identifier detected by group identifier detection module 406 to identify a particular base station. In some embodiments, base station identification module may include or access (e.g., from a remote device) a lookup table that lists group/base station identifiers that may be received in a wireless transmission (e.g., in a group identifier field of a control header, as discussed above) and also lists corresponding base station identities (e.g., eNB IDs, IP addresses, MAC addresses, port/switch addresses, etc.). In some embodiments, base station identification module 408 includes a mapping module that takes the received identifier as an input and outputs the identity of the corresponding base station. In some embodiments, the identified base station may be base station 400. In some embodiments, the identified base station may be a base station other than base station 400.

Base station 400 may include D2D interference mitigation module 410. D2D interference mitigation module 410 may be coupled to base station identification module 408. Once base station identification module 408 determines the identity of the base station corresponding to the received identifier, D2D interference mitigation module 410 may initiate a D2D interference mitigation process with the identified base station. The D2D interference mitigation process initiated by D2D interference mitigation module 410 may depend on the identified base station. Example D2D interference notification and mitigation processes that may be performed by wireless devices and base stations (including base station 400) are discussed below with reference to FIGS. 5 and 6. In some embodiments, D2D interference mitigation module 410 uses an interference measurement provided by a wireless device (e.g., by interference measurement module 208 of wireless device 200 of FIG. 2) in the D2D interference mitigation process. For example, in some embodiments, D2D interference mitigation module 410 may use the level of interference between two D2D communication groups to determine how far apart the channels assigned to the two groups should be (e.g., in frequency). In some embodiments, base station 400 may be configured to perform interference mitigation procedures to ensure that minimum quality of service ("QoS") metrics are met as D2D devices move and as D2D devices are added to and removed from different groups.

Base station 400 may include a base station communication module 416. Base station communication module 416 may be configured to communicate with other base stations through a wired or wireless communication channel. Wired output 418 is shown in FIG. 4. When the base station identified by base station identification module 408 is a different base station than base station 400, base station 400 may communicate with the identified base station to initiate the D2D interference mitigation process.

Base station 400 may also include a control header format module 412. Control header format module 412 may determine a format for a control header to be used in D2D communications by one or more D2D communication groups served by base station 400. For example, control header format module 412 may select from a predetermined set of control header formats (e.g., the "long" and "short" control header formats described above with reference to Tables 1 and 2). The control header format determined by control header format module 412 for a particular D2D communication group may depend on any of a number of factors, such as the number of D2D communication groups in a given area, the potential for interference between the channels assigned to two or more D2D communication groups, and the number of devices in a D2D communication group, among others.

Base station 400 may include wireless device communication module 414. Wireless device communication module 414 may be coupled to receiver/transmitter module 404, and may provide information for wireless transmission to one or more wireless devices served by base station 400. In some embodiments, wireless device communication module 414 may assist in transmitting a signal indicative of the control header format determined by control header format module 414. In some embodiments, wireless device communication module 414 may assist in transmitting one or more signals to D2D communication groups to re-allocate channels assigned to those groups.

Figure 5:
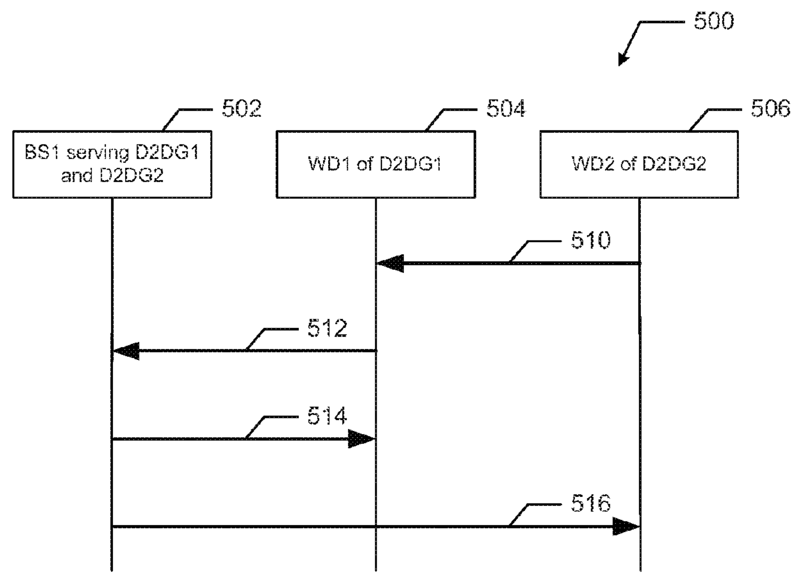
FIG. 5 is a signal flow diagram illustrating an example D2D interference notification and mitigation process when two D2D communication groups are served by a same base station, in accordance with various embodiments.

Referring now to FIG. 5, a signal flow diagram 500 of an example D2D interference notification and mitigation process is illustrated for environments in which two D2D communication groups are served by a same base station, in accordance with various embodiments. Signal flow diagram 500 includes three devices: wireless device WD1 of a first D2D communication group D2DG1 (indicated as 504), wireless device WD2 of a second D2D communication group D2DG2 (indicated as 506), and base station BS1 (indicated as 502) that serves both the first and second D2D communication groups. Signal 510 represents a D2D wireless transmission, sent from WD2 506 to at least one other device in the second D2D communication group D2DG2, which is received as interference by WD1 504 (a device not in the second D2D communication group D2DG2). Signal 510 includes an identifier of the second D2D communication group D2DG2. Upon receipt of signal 510, wireless device WD1 504 may identify the group identifier included in signal 510 (e.g., via group identifier detection module 206 of FIG. 2). Wireless device WD1 504 may also measure a level of interference caused by signal 510 (e.g., via interference measurement module 208 of FIG. 2). Wireless device WD1 504 may transmit the group identifier and the interference measurement as part of an interference report to base station BS1 502 in signal 512. Upon receipt of signal 512, base station BS1 502 may identify the D2D communication group corresponding to the group identifier included in signal 512 (i.e., the second D2D communication group D2DG2 using, e.g., group identifier detection module 406 of FIG. 4) and identifies the base station serving the identified D2D communication group (e.g., using base station identification module 408 of FIG. 4). Because the second D2D communication group D2DG2 is served by base station BS1 506, base station BS1 506 may initiate a D2D interference mitigation process without needing to communicate with any other base stations. As illustrated, in some embodiments, base station BS1 506 may transmit a first D2D channel re-allocation signal 514 to wireless device WD1 504 (and possibly other devices belonging to the first D2D communication group D2DG1) and a second D2D channel re-allocation signal 516 to wireless device WD2 506 (and possibly other devices belonging to the second D2D communication group D2DG2). Channel re-allocation signals 514 and 516 may each include, for example, a new frequency band to which D2D communications within each of the first and second D2D communication groups, respectively, are assigned.

Figure 6:
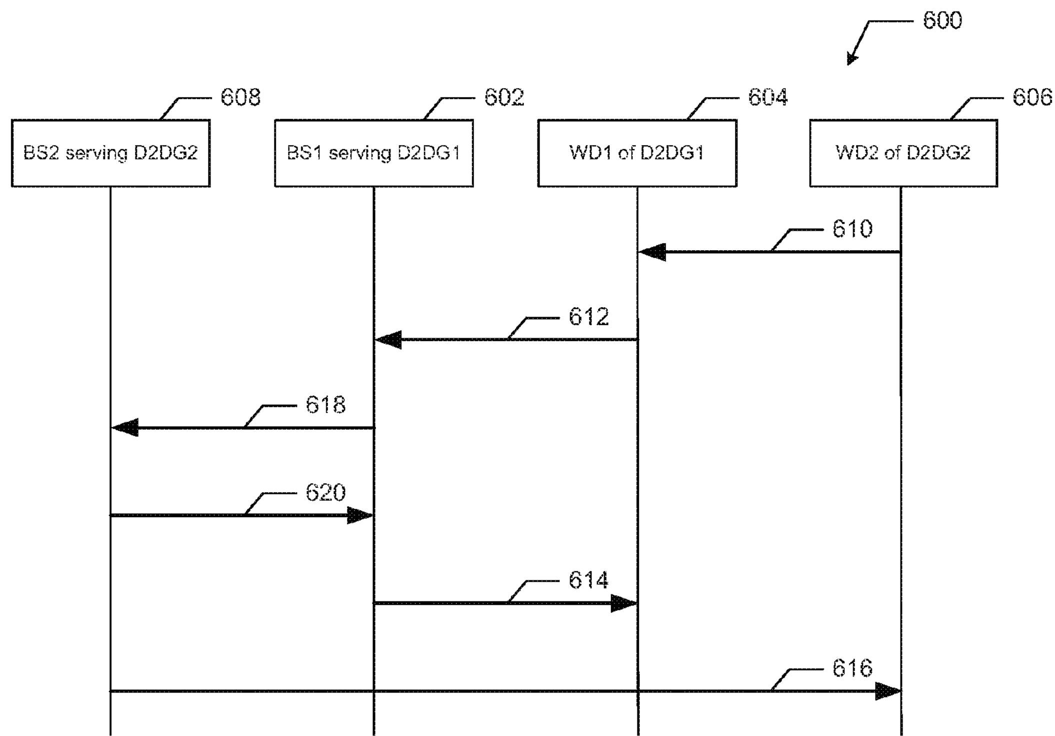
FIG. 6 is a signal flow diagram illustrating an example D2D interference notification and mitigation process when two D2D communication groups are served by different base stations, in accordance with various embodiments.

Referring now to FIG. 6, a signal flow diagram 600 of an example D2D interference notification and mitigation process is illustrated for environments in which two D2D communication groups are served by different base stations, in accordance with various embodiments. Signal flow diagram 600 includes four devices: wireless device WD1 of a first D2D communication group D2DG1 (indicated as 604), wireless device WD2 of a second D2D communication group D2DG2 (indicated as 606), base station BS1 (indicated as 602) that serves the first D2D communication group, and base station BS2 (indicated as 608) that serves the second D2D communication group. Signal 610 represents a D2D wireless transmission, sent from WD2 606 to at least one other device in the second D2D communication group D2DG2, which is received as interference by WD1 604 (a device not in the second D2D communication group D2DG2). Signal 610 includes an identifier of the second D2D communication group D2DG2. Upon receipt of signal 610, wireless device WD1 604 may identify the group identifier included in signal 610 (e.g., via group identifier detection module 206 of FIG. 2). Wireless device WD1 604 may also measure a level of interference caused by signal 610 (e.g., via interference measurement module 208 of FIG. 2). Wireless device WD1 604 may transmit the group identifier and the interference measurement as part of an interference report to base station BS1 602 in signal 612. Upon receipt of signal 612, base station BS1 602 may identify the D2D communication group corresponding to the group identifier included in signal 612 (i.e., the second D2D communication group D2DG2 using, e.g., group identifier detection module 406 of FIG. 4) and identifies the base station serving the identified D2D communication group (e.g., using base station identification module 408 of FIG. 4). Here, the base station serving the second D2D communication group D2DG2 is not base station BS1 602, but base station BS2 608. In response to determining that base station BS2 608 serves the second D2D communication group, base station BS1 606 may initiate a D2D interference mitigation process by transmitting a channel re-allocation request signal 618 to base station BS2 608. In some embodiments, signal 618 also includes other interference-related information, such as a level of interference. Signal 618 may begin a channel re-allocation negotiation process between base station BS1 606 and base station BS2 608. For ease of illustration, only a single channel re-allocation response signal 620 from base station BS2 608 to base station BS1 606 is shown. Signal 620 may include, for example, a confirmation of a proposed channel re-allocation request or other confirmation or selection of a channel to which the first D2D communication group D2DG1 should be assigned. As illustrated, in some embodiments, base station BS1 606 may transmit a first D2D channel re-allocation signal 614 to wireless device WD1 604 (and possibly other devices belonging to the first D2D communication group D2DG1) and base station BS2 608 may transmit a second D2D channel re-allocation signal 616 to wireless device WD2 606 (and possibly other devices belonging to the second D2D communication group D2DG2). Channel re-allocation signals 614 and 616 may each include, for example, a new frequency band to which D2D communications within each of the first and second D2D communication groups, respectively, are assigned.

Figure 7:
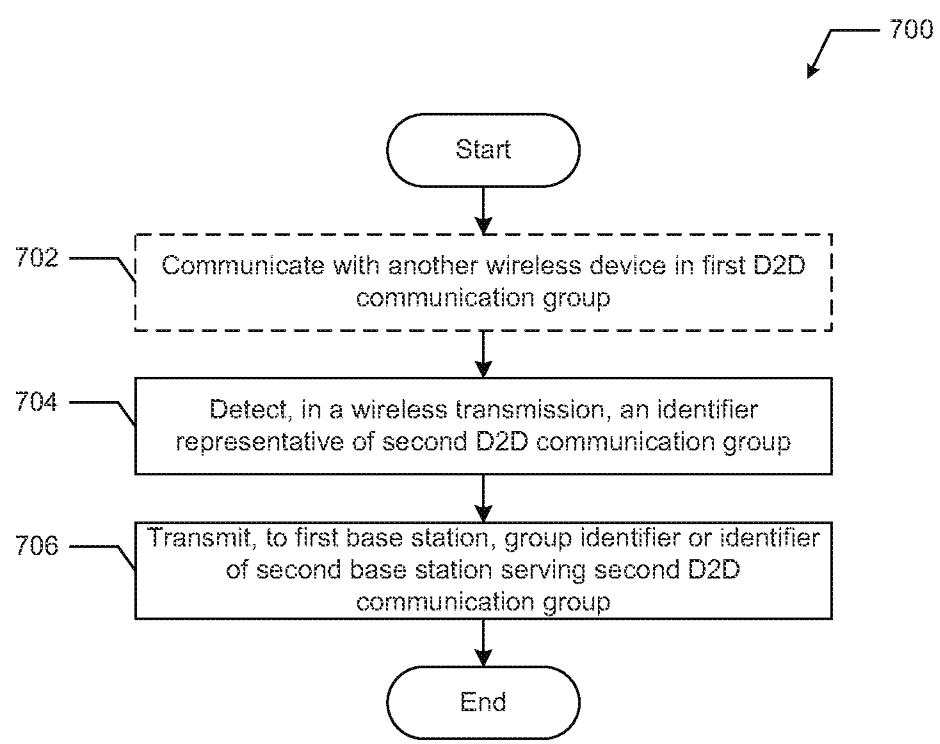
FIG. 7 is a flow diagram of an example D2D interference notification process, in accordance with various embodiments.

Referring now to FIG. 7, a flow diagram is provided of example D2D interference notification process 700 executable by a wireless D2D communication device (such as wireless device 200 of FIG. 2), in accordance with various embodiments. It may be recognized that, while the operations of process 700 (and the other processes described herein) are arranged in a particular order and illustrated once each, in various embodiments, one or more of the operations may be repeated, omitted or performed out of order. For illustrative purposes, operations of process 700 may be described as performed by a first wireless device, which may be configured as described above for wireless device 200 (FIG. 2), but process 700 may be performed by any suitably configured device (e.g., a programmed processing system, an ASIC, or another wireless computing device). In the discussion of process 700, the first wireless device is referred to as belonging to a first D2D communication group and as being served by a first base station.

Process 700 may begin at optional operation 702, in which the first wireless device may communicate with another wireless device in the first D2D communication group. In some embodiments, operation 702 may be performed by processing circuitry included in receiver/transmitter module 204 and D2D communication module 214 (FIG. 2). In some embodiments, the intra-group communication of operation 702 is carried out according to a multiple access protocol.

At operation 704, the first wireless device may detect a group identifier in a wireless transmission from a second wireless device served by a second base station. The group identifier may be representative of a second D2D communication group to which the second wireless device belongs. The second D2D communication group may be different from the first D2D communication group to which the first wireless device belongs, and thus the wireless transmission from the second wireless device may be viewed by the first wireless device as interference. In some embodiments, operation 704 may be performed by processing circuitry included in group identifier detection module 206 (FIG. 2). In some embodiments, the wireless transmission from the second wireless device is received on a channel allocated to the first D2D communication group by the first base station. In other words, both the first and second D2D groups were assigned to the same or overlapping channels by the first and second base stations, respectively.

In some embodiments, operation 704 may include identifying a group identifier in a group identifier field of a control header of the wireless transmission from the second wireless device. Examples of control headers that may include group identifier fields are described above (e.g., with reference to Tables 1 and 2). A control header may include one or more other fields in addition to the group identifier field. For example, in some embodiments, a control header may include a control type field and a control message field. In some embodiments, a control header may include a duration field with a value indicative of a number of time slots occupied by the control header and a following related transmission. In some embodiments, a control header may include a control message size field and a data payload size field. A control header and a data payload may be arranged in different packet configurations. For example, in some embodiments, a control header may share a resource block time slot with a data payload.

At operation 706, the first wireless device may transmit the group identifier or an identifier of the second base station to the first base station serving the first wireless device. In some embodiments, operation 706 may be performed by processing circuitry included in receiver/transmitter module 204 and base station communication module 210 (FIG. 2). The transmission of the group identifier or the identifier of the second base station may notify the first base station of interference from the second D2D communication group. In some embodiments, the first and second base stations are the same base station; that is, the first base station serves both the first D2D communication group and the second D2D communication (e.g., as illustrated in FIG. 1, in which base station 124 serves both D2D communication groups 104 and 106). In some embodiments of operation 706, the first wireless device may further transmit, to the first base station, a measurement of a level of interference from the second wireless device.

Figure 8:
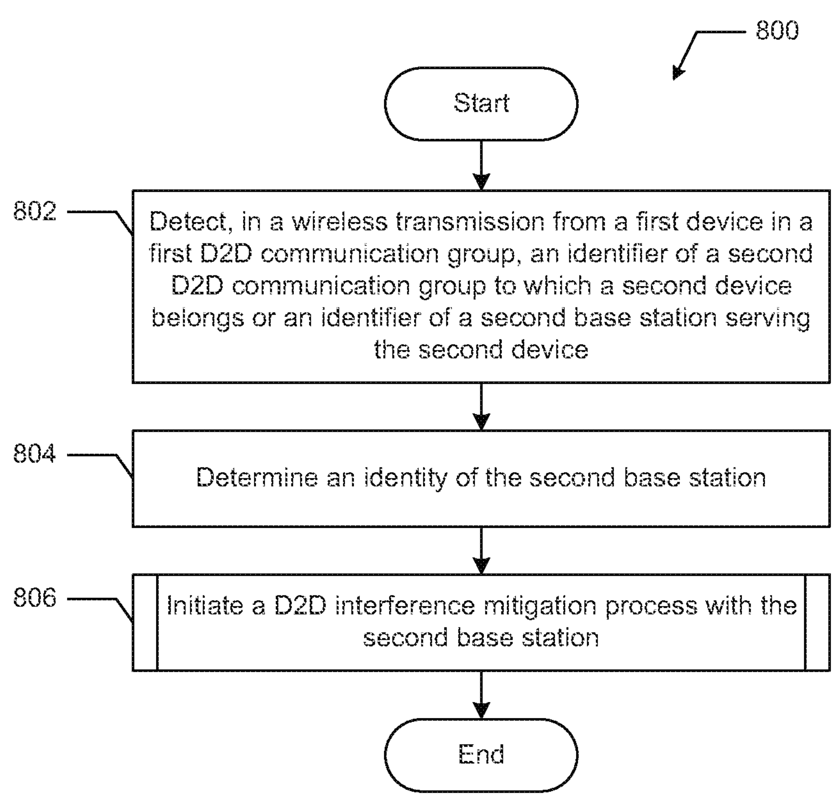
FIG. 8 is a flow diagram of an example D2D interference mitigation initiation process, in accordance with various embodiments.

Referring now to FIG. 8, a flow diagram is provided of example D2D interference mitigation initiation process 800, in accordance with various embodiments. For illustrative purposes, operations of process 800 may be described as performed by a first base station, which may be configured as described above for base station 400 (FIG. 4), but process 800 may be performed by any suitably configured device (e.g., a programmed processing system, an ASIC, or another base station).

At operation 802, the first base station may detect, in a wireless transmission from a first wireless communications device belonging to a first device-to-device (D2D) communication group (e.g., wireless device 200 of FIG. 2), an identifier of a second D2D communication group to which a second wireless communications device belongs or an identifier of a second base station serving the second wireless communications device. In some embodiments, operation 802 may be performed by processing circuitry included in receiver/transmitter module 404 and group identifier detection module 406 (FIG. 4). As discussed above with reference to process 700 of FIG. 7, the wireless transmission from the first wireless communications device may notify the first base station of interference from the second D2D communication group.

At operation 804, the first base station may determine an identity of the second base station based at least in part on the identifier. In some embodiments, operation 804 may be performed by processing circuitry included in base station identification module 408 (FIG. 4). In some embodiments, operation 804 may be performed in part by a mapping module that outputs the identity of the second base station in response to an input of the identifier detected at operation 802.

At operation 806, the first base station may initiate a D2D interference mitigation process with the second base station identified at operation 804. In some embodiments, operation 806 may be performed by processing circuitry included in D2D interference mitigation module 410 (FIG. 4). Any of the interference mitigation processes described herein may be initiated at operation 806, including those described above with reference to FIGS. 5 and 6. Particular embodiments of operation 806 are described below with reference to process 900 of FIG. 9.

Figure 9:
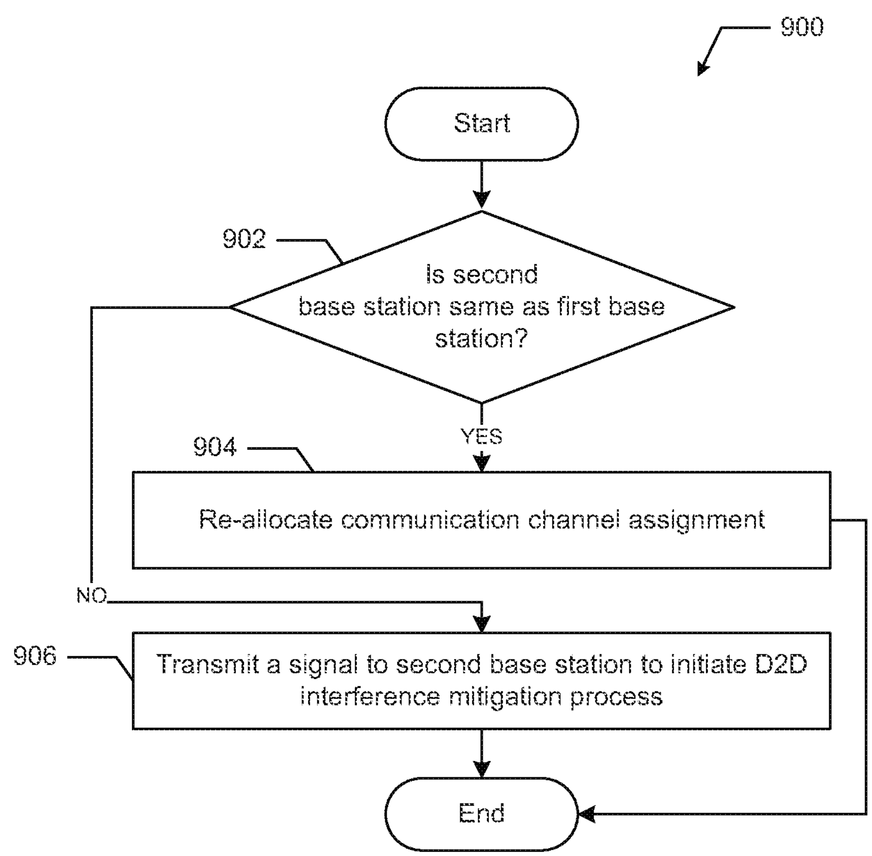
FIG. 9 is a flow diagram of an example D2D interference mitigation process, in accordance with various embodiments.

Referring now to FIG. 9, a flow diagram is provided of example D2D interference mitigation process 900, in accordance with various embodiments. As described above with reference to process 800 of FIG. 8, for illustrative purposes, operations of process 900 may be described as performed by a first base station.

At decision block 902, the first base station determines whether the second base station is a same base station as the first base station. In some embodiments, the determination of decision block 902 may be made by base station identification module 408 (FIG. 4). If the first base station determines that the second base station is a same base station, the first base station may proceed to operation 904 and may re-allocate a communication channel assigned to at least one of the first D2D communication group and the second D2D communication group. In some embodiments, operation 904 may be performed by D2D interference mitigation module 410 (FIG. 4). If the first base station determines at decision block 902 that the second base station is a different base station than the first base station, the first base station may proceed to operation 906 and transmit a signal to the second base station to initiate the D2D interference mitigation process. In some embodiments, operation 906 may be performed by D2D interference mitigation module 410 and base station communication module 416 (FIG. 4). In some embodiments, the signal transmitted to the second base station at operation 906 may include a channel re-allocation request.

Figure 10:
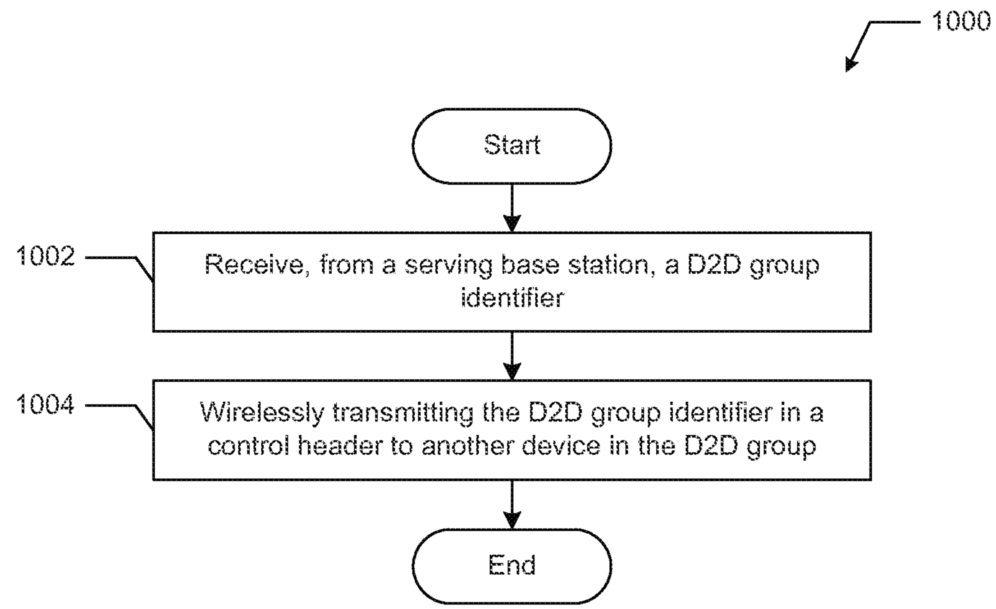
FIG. 10 is a flow diagram of an example process for including a D2D group identifier in a D2D wireless transmission, in accordance with various embodiments.

Referring now to FIG. 10, a flow diagram is provided of example process 1000 for including a D2D group identifier in a D2D wireless transmission, executable by a wireless D2D communication device (such as wireless device 200 of FIG. 2), in accordance with various embodiments. For illustrative purposes, operations of process 1000 may be described as performed by a first wireless device, which may be configured as described above for wireless device 200 (FIG. 2), but process 1000 may be performed by any suitably configured device (e.g., a programmed processing system, an ASIC, or another wireless computing device). In the discussion of process 1000, the first wireless device is referred to as belonging to a first D2D communication group and as being served by a first base station.

Process 1000 may begin at operation 1002, in which the first wireless device may receive, from the first base station (i.e., the base station serving the first wireless device), an identifier of the first D2D group (i.e., the group to which the first wireless device belongs). In some embodiments, operation 1002 may be performed by processing circuitry included in receiver/transmitter module 204 and base station communication module 210 (FIG. 2).

In some embodiments, the identifier of the first D2D group uniquely identifies the first D2D group among all D2D groups served by the first base station or among all D2D groups in a network served by multiple base stations. In some embodiments, the identifier of the first D2D group is a same identifier as an identifier of another D2D group. The other D2D group may be served by the first base station, or served by a base station different from the first base station.

In some embodiments, the size (e.g., the number of bits) of the identifier of the first D2D group received at operation 1002 may be selected by the first base station. For example, in some embodiments, the size of the identifier of the first D2D group may be selected by the first base station based at least in part on a number of D2D groups are served by the first base station. When the first base station serves many D2D groups, the first base station may select a larger size for the identifier of the first D2D group in order to have enough bits available to provide different identifiers for the many D2D groups. In another example, in some embodiments, the size of the identifier of the first D2D group may be selected by the first base station based at least in part on the inter-group proximity of different D2D groups served by the first base station. When the first base station serves multiple D2D groups that are spaced far enough apart so that significant inter-group interference is unlikely, the first base station may use a smaller number of bits for the D2D group identifiers (which may result in two or more D2D groups having the same identifier).

In some embodiments, the identifier includes data representative of an identifier of the first base station. This may allow ready identification of the base station serving the first D2D group. The data representative of an identifier of the first base station may take any of a number of forms. In some embodiments, the data representative of an identifier of the first base station includes an eNB identifier. In some embodiments, the data representative of the identifier of the first base station includes a shortened eNB identifier (e.g., the output of a hash function to which an eNB identifier has been supplied).

At operation 1004, the first wireless device may wirelessly transmit the identifier of the D2D group (received at operation 1002) in a control header of a wireless communication directed to another wireless device in the first D2D group. Any of the techniques described herein for including a D2D group identifier in a control header may be used at operation 1004. In some embodiments, operation 1004 may be performed by processing circuitry included in control header generation module 212 and D2D communication module 214 (FIG. 2).

Figure 11:
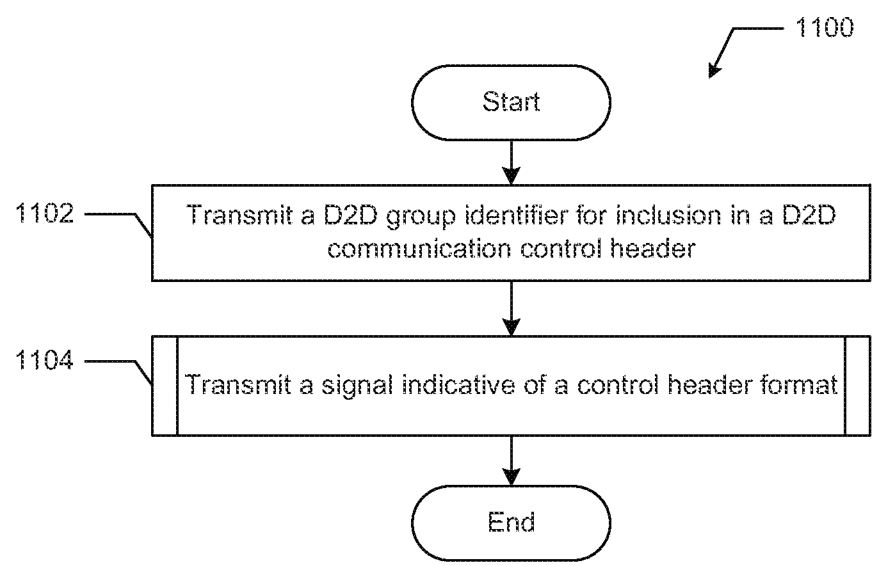
FIG. 11 is a flow diagram of an example control header configuration process, in accordance with various embodiments.

Referring now to FIG. 11, a flow diagram is provided of example process 1100 for configuring a control header, executable by a base station (such base station 400 of FIG. 4), in accordance with various embodiments. For illustrative purposes, operations of process 1100 may be described as performed by a first base station, which may be configured as described above for base station 400 (FIG. 4), but process 1100 may be performed by any suitably configured device (e.g., a programmed processing system, an ASIC, or another base station). In the discussion of process 1100, the first base station is referred to as serving a first wireless device group that belongs to a first D2D communication group.

At operation 1102, the first base station may transmit, to the first wireless device, an identifier of the first D2D group for inclusion in a control header of wireless communications transmitted by the first wireless device to other wireless devices belonging to the first D2D group. The identifier of the first D2D group may take the form of any of the D2D group identifier described herein. In some embodiments, operation 1102 may be performed by receiver/transmitter module 404 and wireless device communication module 414 (FIG. 4).

At operation 1104, the first base station may transmit, to the first wireless device, a signal indicative of a format to be followed by the control header. In some embodiments, the control header format may include one of a long control header format and a short control header format (e.g., as discussed above with reference to Tables 1 and 2, respectively). In some embodiments, the short control header format may not include a sender identification field. In some embodiments, the short control header format does not include a control message size field or a data payload size field. In some embodiments, operation 1104 may be performed by control header format module 412 and wireless device communication module 414 (FIG. 4). Particular embodiments of operation 1104 are described below with reference to process 1200 of FIG. 12.

Figure 12:
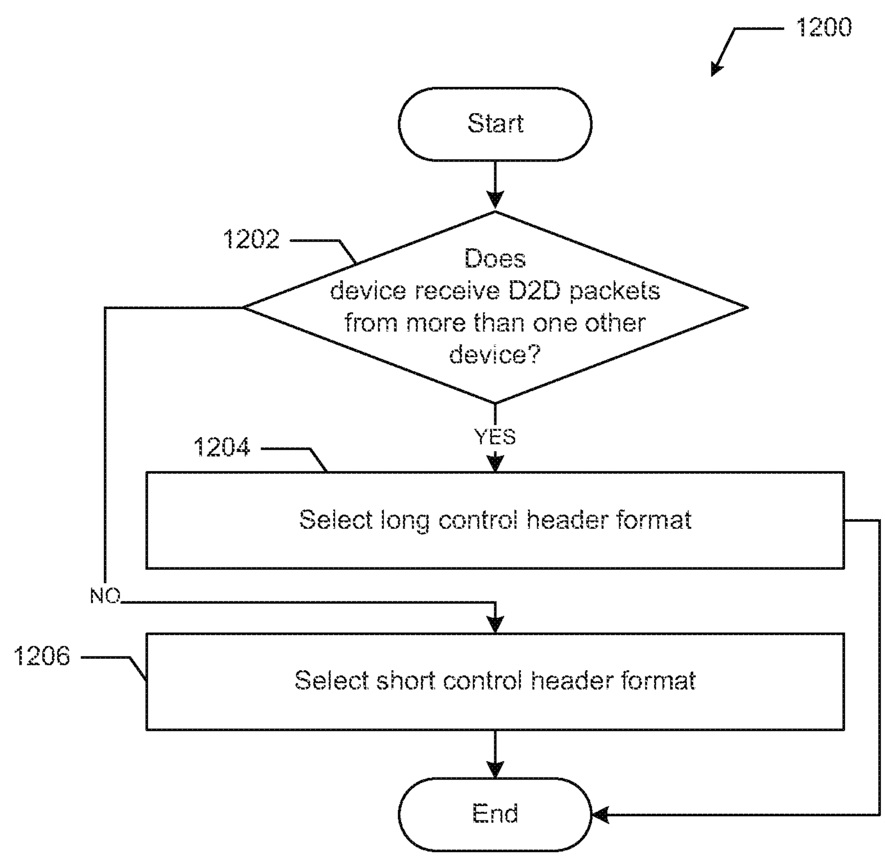
FIG. 12 is a flow diagram of an example control header format indication process, in accordance with various embodiments.

Referring now to FIG. 12, a flow diagram is provided of example control header format indication process 1200, in accordance with various embodiments. As described above with reference to process 1100 of FIG. 11, for illustrative purposes, operations of process 1100 may be described as performed by a first base station.

At operation 1202, the first base station may determine whether the first wireless device receives D2D packets from at most one other wireless device in the first D2D group. If yes, the first base station may proceed to operation 1206 and select the short control header format for transmission to the first wireless device (e.g., at operation 1104 of FIG. 11).

If the first base station determines at operation 1202 that the first wireless device does not receive D2D packets from at most one other wireless device in the first D2D group (e.g., that the first wireless device receives D2D packets from two or more wireless devices in the first D2D group), the first base station may proceed to operation 1204 and select the long control header format for transmission to the first wireless device (e.g., at operation 1104 of FIG. 11).

Figure 13:
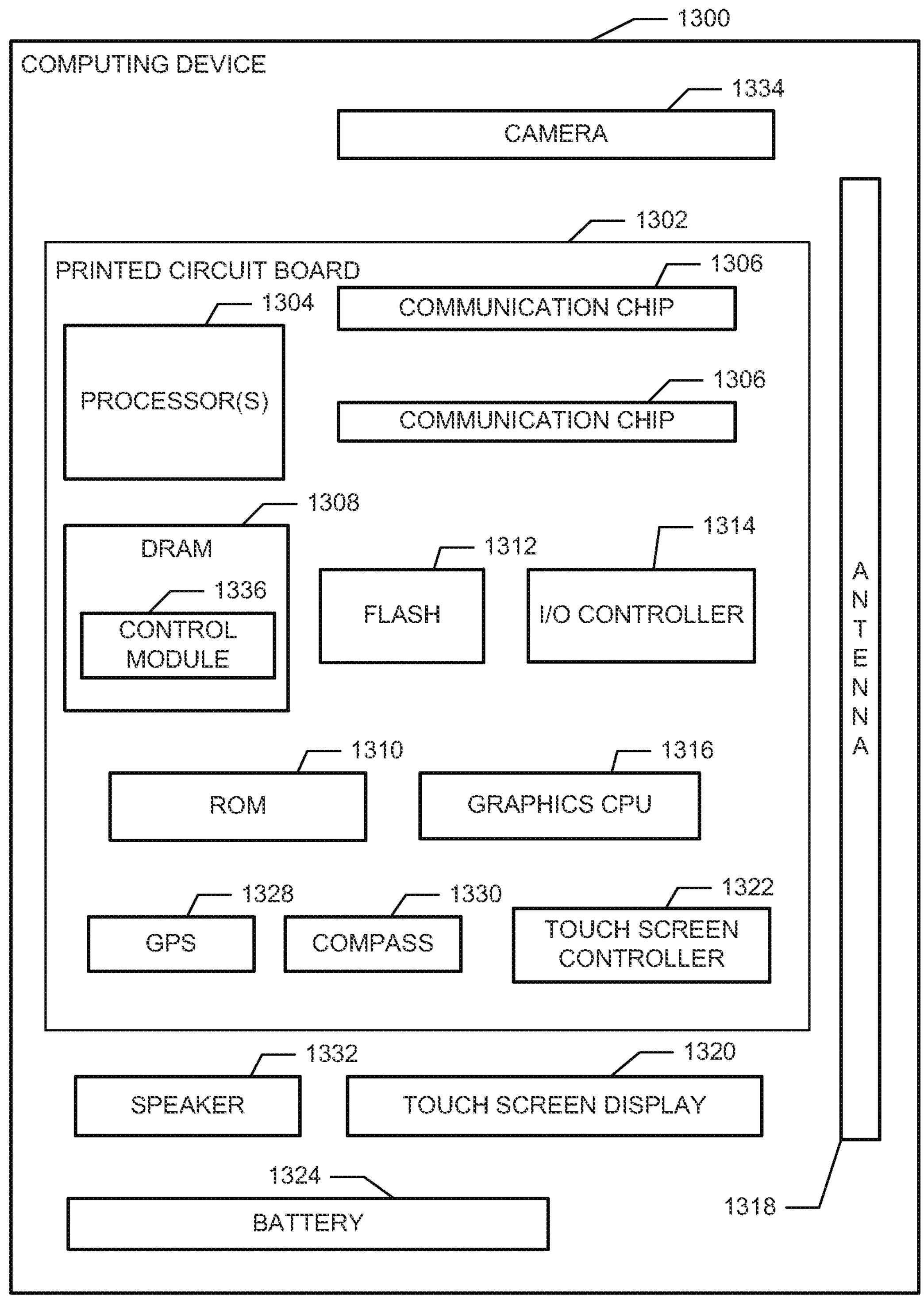
FIG. 13 is a block diagram of an example computing device suitable for practicing the disclosed embodiments, in accordance with various embodiments.

FIG. 13 is a block diagram of an example computing device suitable for practicing disclosed embodiments, in accordance with various embodiments. Computing device 1300 may include a number of components, including one or more processor(s) 1304 and at least one communication chip 1306. In various embodiments, processor 1304 may include a processor core. In various embodiments, at least one communication chip 1306 may also be physically and electrically coupled to processor 1304. In further implementations, communication chips 1306 may be part of processor 1304. In various embodiments, computing device 1300 may include PCB 1302. For these embodiments, processor 1304 and communication chip 1306 may be disposed thereon. In alternate embodiments, the various components may be coupled without the employment of PCB 1302.

Depending on its applications, computing device 1300 may include other components that may or may not be physically and electrically coupled to PCB 1302. These other components include, but are not limited to, volatile memory (e.g., dynamic random access memory 1308, also referred to as "DRAM"), non-volatile memory (e.g., read-only memory 1310, also referred to as "ROM," one or more hard disk drives, one or more solid-state drives, one or more compact disc drives, and/or one or more digital versatile disc drives), flash memory 1312, input/output controller 1314, a digital signal processor (not shown), a crypto processor (not shown), graphics processor 1316, one or more antenna 1318, touch screen display 1320, touch screen controller 1322, other displays (such as liquid-crystal displays, cathode-ray tube displays and e-ink displays, not shown), battery 1324, an audio codec (not shown), a video codec (not shown), global positioning system (GPS) device 1328, compass 1330, an accelerometer (not shown), a gyroscope (not shown), speaker 1332, camera 1334, and a mass storage device (such as hard disk drive, a solid state drive, compact disk (CD), digital versatile disk (DVD)) (not shown), and so forth. In various embodiments, processor 1304 may be integrated on the same die with other components to form a System on Chip (SoC).

In various embodiments, volatile memory (e.g., DRAM 1308), non-volatile memory (e.g., ROM 1310), flash memory 1312, and the mass storage device may include programming instructions configured to enable computing device 1300, in response to execution by processor(s) 1304, to practice all or selected aspects of the processes described herein. For example, one or more of the memory components such as volatile memory (e.g., DRAM 1308), non-volatile memory (e.g., ROM 1310), flash memory 1312, and the mass storage device may include temporal and/or persistent copies of instructions that, when executed, enable computing device 1300 to operate control module 1336 configured to practice all or selected aspects of the processes described herein. Memory accessible to computing device 1300 may include one or more storage resources that are physically part of a device on which computing device 1300 is installed and/or one or more storage resources that is accessible by, but not necessarily a part of, computing device 1300. For example, a storage resource may be accessed by computing device 1300 over a network via communications chips 1306.

Communication chips 1306 may enable wired and/or wireless communications for the transfer of data to and from computing device 1300. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems. However, communication chips 1306 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. Computing device 1300 may include a plurality of communication chips 1306. For instance, a first communication chip 1306 may be dedicated to shorter range wireless communications such as Wi-Fi and Bluetooth and a second communication chip 1306 may be dedicated to longer range wireless communications such as GPS, EDGE, GPRS, CDMA, WiMAX, LTE, Ev-DO, and others.

In various implementations, computing device 1300 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, computing device 1300 may be any other electronic device that processes data.

The following paragraphs describe examples of various embodiments. In various embodiments, a wireless device includes circuitry configured to detect a group identifier in a wireless transmission from a second wireless device served by a second eNB, the group identifier representative of a second device-to-device (D2D) communication group to which the second wireless device belongs, the second D2D communication group different from a first D2D communication group to which the wireless device belongs, and transmit the group identifier or an identifier of the second eNB to a first eNB serving the wireless device to notify the first eNB of interference from the second D2D communication group. Detecting a group identifier in a wireless transmission from a second wireless device may include receiving the wireless transmission on a channel allocated, by the first eNB, to the first D2D communication group. The first eNB may be a same eNB as the second eNB. The circuitry may be further configured to transmit, to the first eNB, a measurement of a level of interference from the second wireless device. Detecting a group identifier in a wireless transmission from a second wireless device served by a second eNB may include identifying a group identifier in a group identifier field of a control header of the wireless transmission. The control header of the wireless transmission may further include a control type field and a control message field. The control header of the wireless transmission may further include a duration field with a value indicative of a number of time slots occupied by the control header and a following related transmission. The control header of the wireless transmission may further include a control message size field and a data payload size field. The control header may share a resource block time slot with a data payload. The circuitry may be further configured to communicate with at least one other member of the first D2D communication group according to a multiple access protocol.

In various embodiments, an eNB includes a first module for detecting, in a wireless transmission from a first wireless communications device belonging to a first device-to-device (D2D) communication group, an identifier of a second D2D communication group to which a second wireless communications device belongs or an identifier of a second eNB serving the second wireless communications device; a second module for determining an identity of the second eNB based at least in part on the identifier; and a third module for initiating a D2D interference mitigation process with the identified second eNB. The second module may include a mapping module that outputs the identity of the second eNB in response to an input of the identifier. Initiating a D2D interference mitigation process with the identified second eNB may include determining that the second eNB is a same eNB as the first eNB, and re-allocating a communication channel assigned to at least one of the first D2D communication group and the second D2D communication group. Initiating a D2D interference mitigation process with the identified second eNB may include determining that the second eNB is a different eNB than the first eNB, and transmitting a signal to the second eNB to initiate the D2D interference mitigation process. The signal may include a channel re-allocation request.

In various embodiments, a device-to-device (D2D) communications device includes a first module for receiving, in a wireless transmission from an eNB serving the D2D communications device, an identifier of a D2D group to which the D2D communications device belongs, the identifier including data representative of an identifier of the eNB; and a second module for wirelessly transmitting the identifier of the D2D group in a control header of a wireless communication directed to another D2D communications device in the D2D group. The data representative of the identifier of the eNB serving the D2D communications device may include a shortened version of an eNB identifier. The identifier of the D2D group may be a same identifier as an identifier of another D2D group. The another D2D group may be served by the eNB. The another D2D group may be served by an eNB different from the eNB serving the D2D communications device. A size of the identifier of the D2D group may be selected by the eNB based at least in part on a number of D2D groups served by the eNB. A size of the identifier of the D2D group may be selected by the eNB based at least in part on inter-group proximity of D2D groups served by the eNB.

In various embodiments, at least one machine-accessible medium includes instructions stored thereon that are configured to cause an eNB, in response to execution of the instructions by the eNB, to transmit, to a first wireless communications device belonging to a first device-to-device (D2D) communication group, an identifier of the first D2D group for inclusion in a control header of wireless communications transmitted by the first wireless communications device to other wireless communications devices belonging to the first D2D communication group, and transmit, to the first wireless communications device, a signal indicative of a format to be followed by the control header. The control header format may include one of a short control header format and a long control header format. The short control header format may not include a sender identification field. The short control header format may not include a control message size field or a data payload size field. In some embodiments, transmit, to the first wireless communications device, a control header format may include determine that the first wireless communications device receives D2D packets from at most one other wireless communications device in the first D2D group, and select the short control header format for transmission to the first wireless communications device.

Computer-readable media (including non-transitory computer-readable media), methods, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A wireless device comprising:

first circuitry to detect a group identifier in a wireless transmission from a second wireless device served by a second eNB, the group identifier representative of a second device-to-device (D2D) communication group to which the second wireless device belongs, the wireless transmission directed to a third wireless device that belongs to the second D2D communication group, the group identifier comprising data representative of an identifier of the second eNB, and the second D2D communication group different from a first D2D communication group to which the wireless device belongs; and second circuitry to, in response to detection of the group identifier, transmit the group identifier or the identifier of the second eNB to a first eNB serving the wireless device to notify the first eNB of interference from the second D2D communication group.

2. The wireless device of claim 1, wherein detect a group identifier in a wireless transmission from a second wireless device comprises:

receive the wireless transmission on a channel allocated, by the first eNB, to the first D2D communication group.

3. The wireless device of claim 1, wherein the first eNB is a same eNB as the second eNB.

4. The wireless device of claim 1, wherein the second circuitry is further to:

transmit, to the first eNB, a measurement of a level of interference from the second wireless device.

5. The wireless device of claim 1, wherein detect a group identifier in a wireless transmission from a second wireless device served by a second eNB comprises identify a group identifier in a group identifier field of a control header of the wireless transmission.

6. The wireless device of claim 5, wherein the control header of the wireless transmission further comprises a control type field and a control message field.

7. The wireless device of claim 5, wherein the control header of the wireless transmission further comprises a duration field with a value indicative of a number of time slots occupied by the control header and a following related transmission.

8. The wireless device of claim 5, wherein the control header of the wireless transmission further comprises a control message size field and a data payload size field.

9. The wireless device of claim 5, wherein the control header shares a resource block time slot with a data payload.

10. The wireless device of claim 1, wherein the second circuitry is further to:

communicate with at least one other member of the first D2D communication group according to a multiple access protocol.

11. An eNB, comprising:

a first module for detecting, in a wireless transmission from a first wireless communications device belonging to a first device-to-device (D2D) communication group, an identifier of a second D2D communication group to which a second wireless communications device belongs or an identifier of a second eNB serving the second wireless communications device, wherein the wireless transmission is transmitted to the eNB by the first wireless communications device in response to detection by the first wireless communications device of a wireless transmission between two members of the second D2D communication group, the wireless transmission between the two members of the second D2D communication group includes the identifier of the second D2D communication group, and the identifier of the second D2D communication group comprises data representative of an identifier of the second eNB;

a second module for determining an identity of the second eNB based at least in part on the identifier; and a third module for initiating a D2D interference mitigation process with the identified second eNB.

12. The eNB of claim 11, wherein the second module comprises a mapping module that outputs the identity of the second eNB in response to an input of the identifier.

13. The eNB of claim 11, wherein initiating a D2D interference mitigation process with the identified second eNB comprises:

determining that the second eNB is a same eNB as the first eNB; and re-allocating a communication channel assigned to at least one of the first D2D communication group and the second D2D communication group.

14. The eNB of claim 11, wherein initiating a D2D interference mitigation process with the identified second eNB comprises:

determining that the second eNB is a different eNB than the first eNB; and transmitting a signal to the second eNB to initiate the D2D interference mitigation process.

15. The eNB of claim 14, wherein the signal comprises a channel re-allocation request.

16. A device-to-device (D2D) communications device, comprising:

a first module for receiving, in a wireless transmission from an eNB serving the D2D communications device, an identifier of a D2D group to which the D2D communications device belongs, the identifier comprising data representative of an identifier of the eNB; and a second module for wirelessly transmitting the identifier of the D2D group in a control header of a wireless communication directed to another D2D communications device in the D2D group.

17. The D2D communications device of claim 16, wherein the data representative of the identifier of the eNB serving the D2D communications device comprises a shortened version of an eNB identifier.

18. The D2D communications device of claim 16, wherein the identifier of the D2D group is a same identifier as an identifier of another D2D group.

19. The D2D communications device of claim 18, wherein the another D2D group is served by the eNB.

20. The D2D communications device of claim 18, wherein the another D2D group is served by an eNB different from the eNB serving the D2D communications device.

21. The D2D communications device of claim 16, wherein a size of the identifier of the D2D group is selected by the eNB based at least in part on a number of D2D groups served by the eNB.

22. The D2D communications device of claim 16, wherein a size of the identifier of the D2D group is selected by the eNB based at least in part on inter-group proximity of D2D groups served by the eNB.

23. At least one machine-accessible medium comprising instructions stored thereon that are configured to cause an eNB, in response to execution of the instructions by the eNB, to:

transmit, to a first wireless communications device belonging to a first device-to-device (D2D) communication group, an identifier of the first D2D group for inclusion in a control header of wireless communications transmitted by the first wireless communications device to other wireless communications devices belonging to the first D2D communication group; and transmit, to the first wireless communications device, a signal indicative of a format to be followed by the control header.

24. The at least one machine-accessible medium of claim 23, wherein the control header format includes one of a short control header format and a long control header format.

25. The at least one machine-accessible medium of claim 24, wherein the short control header format does not include a sender identification field.

26. The at least one machine-accessible medium of claim 24, wherein the short control header format does not include a control message size field or a data payload size field.

27. The at least one machine-accessible medium of claim 24, wherein transmit, to the first wireless communications device, a control header format comprises:

determine that the first wireless communications device receives D2D packets from at most one other wireless communications device in the first D2D group; and select the short control header format for transmission to the first wireless communications device.

* * * * *